United States Patent [19]

Ahn

[11] Patent Number: 5,056,135
[45] Date of Patent: Oct. 8, 1991

[54] METHOD OF AUTOMATIC EQUALIZED DISTRIBUTION OF RING LOADS FOR TELEPHONE EXCHANGE SYSTEM

[75] Inventor: Kyo-Hwan Ahn, Suwon, Rep. of Korea

[73] Assignee: SamSung Electronics Co., Ltd., Suwon, Rep. of Korea

[21] Appl. No.: 442,715

[22] Filed: Nov. 29, 1989

[30] Foreign Application Priority Data

Nov. 30, 1988 [KR] Rep. of Korea ............... 1988-15866

[51] Int. Cl.⁵ ........................................... H04M 3/02
[52] U.S. Cl. ................................. 379/252; 379/253; 379/418
[58] Field of Search ............... 379/252, 253, 254, 255, 379/418, 290

[56] References Cited

U.S. PATENT DOCUMENTS 4,075,430 2/1978 Reines .................................. 379/290
4,113,990 9/1978 Nojiri et al. ......................... 379/255
4,656,659 4/1987 Chea, Jr. ........................... 379/255 X

*Primary Examiner*—James L. Dwyer
*Attorney, Agent, or Firm*—Robert E. Bushnell

[57] ABSTRACT

A method of automatically and equally distributing the ring load for an exchange system. The subscribers are grouped so that at any one time the subscribers of one group only is supplied with the ring current for ringing the telephone. If the number of the subscribers exceeds the allowable limit within the specified on time, the on time is automatically reset by use of a subtracting time to limit the ring load within a specified value.

8 Claims, 7 Drawing Sheets

SUBSCRIBER PORT TABLE

| PORT NUMBER | STATE OF SERVICE | SERVICE GROUP | GROUP 0 |
|---|---|---|---|

FIG. 8A

SERVICE GROUP TABLE

| GROUP 0 | NUMBER OF SUBSCRIBERS IN GROUP 0 |
|---|---|

FIG. 8B

DYNAMIC DATA TABLE

| NUMBER OF DYNAMIC SERVICE GROUPS |
|---|
| SUBTRACTING TIME(d) |
| ON-TIME(ON) |
| OFF-(OFF) |

FIG. 8C

BASIC DATA TABLE

| NUMBER OF BASIC SERVICE GROUPS |
|---|
| MAXIMUM NUMBER OF SUBSCRIBER IN ONE GROUP |
| ON-TIME(ON) |
| ON-TIME(OFF) |

FIG. 8D

PRESENT SERVICE DATA TABLE

| PRESENT SERVICE GROUP | ON-TIME |
|---|---|

FIG. 8E

METHOD OF AUTOMATIC EQUALIZED DISTRIBUTION OF RING LOADS FOR TELEPHONE EXCHANGE SYSTEM

BACKGROUND OF THE INVENTION

The present invention relates to a method of providing subscribers with ring signal service in an exchange system, and more particularly a method of automatically and equally distributing the ring signal to a plurality of subscribers with a ring signal generator of small capacity.

Generally, the ring signal generator 10 of an exchange system in FIG. 1 is connected to a subscriber circuit 20 to supply the ring signal to one or a plurality of telephones ST1–STm under control of a central processing unit (CPU) module 30.

Referring to FIG. 2 for representing an exemplified waveform of a fundamental ring signal, an interval ON represents a time duration connecting the ring signal, and a next interval OFF another time duration disconnecting the ring signal. A control signal from the CPU module 30 is decoded by a decoder 50, whereby ring service control data from the CPU module 30 are latched by addressable latch 40 to control on/off of ring relays RY1–RYn. Namely, the addressable latch 40 latches the output data of the CPU module 30 to switch the relays RY1–RYn on or off, whereby supplying of the ring signal is controlled.

Since a ring current should be supplied from the ring signal generator 10 to any one of the subscriber telephones ST1–STn to provide the ring service in a specified time period such as T1 to T2, T3 to T4 and so on, as shown in FIG. 3, an amount of the ring current to be supplied depends on a number of the subscriber telephones ST1–STn to be serviced. Therefore, as increases the number of the subscribers to be served, also increases the quantity of the ring current of the ring signal generator 10. This large amount of the ring current often results in waste of electric power in the exchange system.

SUMMARY OF THE INVENTION

It is therefore an object of the present invention to provide a method of supplying an adequate ring signal to a plurality of subscriber telephones, with single ring signal generator.

It is another object of the present invention to provide a method of equally and adequately furnishing a ring service to a plurality of subscribers who requires a waking-up service.

According to one aspect of the present invention, a method of performing automatically equalized distribution of ring loads for an exchange system, particularly an electronic exchange system, comprises the steps of:
(a) comparing a total number of subscribers to be ring serviced with a number of basic groups multiplied by a maximum number of the subscribers in one of said groups;
(b) conforming an on/off time of the ring signal to the basic on/off time, by clearing a subtracting time, and also conforming a number of the ring service groups to the number of the basic groups, when the total number of the subscribers to be served is smaller than the number of the basic groups multiplied by the maximum number of the subscribers in each basic group;
(c) calculating the subtracting time, a dynamic on/off time, and the number of the ring service groups, when the number of the subscribers to be served is greater than the number of the basic groups multiplied by the maximum number of the subscribers in each basic groups;
(d) representing a state of the ring service and the group to be served onto a given subscriber port table and thereafter correcting a table of the ring service group, on the basis of results of the steps (b) as well as (c);
(e) checking whether it is time to interrupt ring signal or not;
(f) decreasing on-time of the present service data when it is the time of ring service;
(g) providing all the subscribers in a corresponding group with the ring signal while it is the time of ring service; and
(h) after the ring signal service, correcting the dynamic service data by data of a next group.

BRIEF DESCRIPTION OF THE DRAWINGS

For a better understanding of the invention and to show how the same may be carried into effect, reference will now be made, by way of example, to the accompanying diagrammatic drawings, in which:

FIGS. 8A to 8E show memory map tables according to the present invention.

DETAILED DESCRIPTION OF THE INVENTION

The present invention will now be described more specifically with reference to the drawings attached only by way of example.

Figure 1:
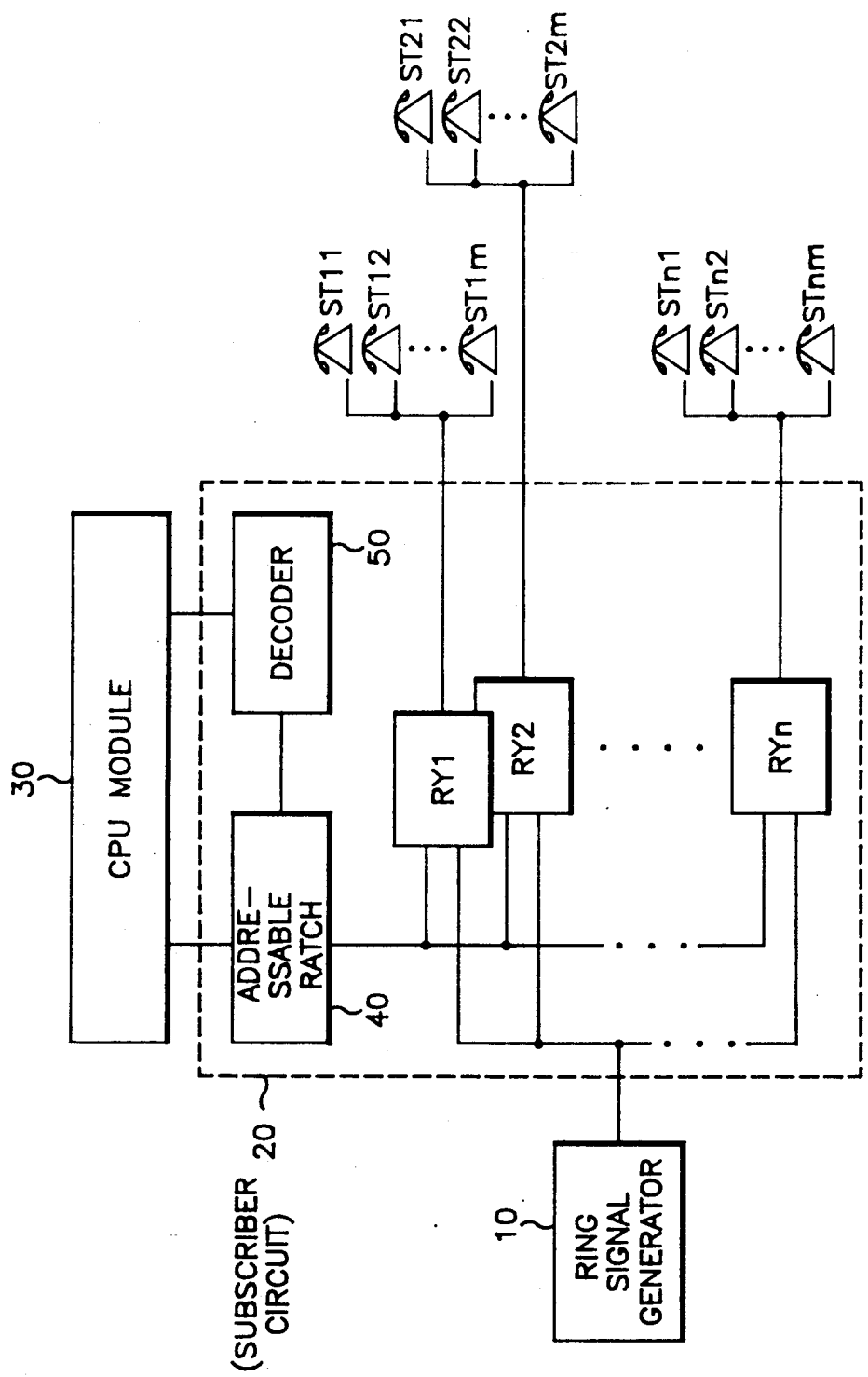
FIG. 1 shows a schematic block diagram of a part of exchange system to be applied for the present invention.
Figure 2:
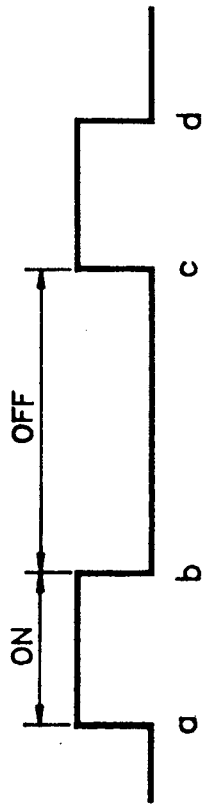
FIG. 2 shows an example of a fundamental ring signal with on/off intervals.
Figure 3:
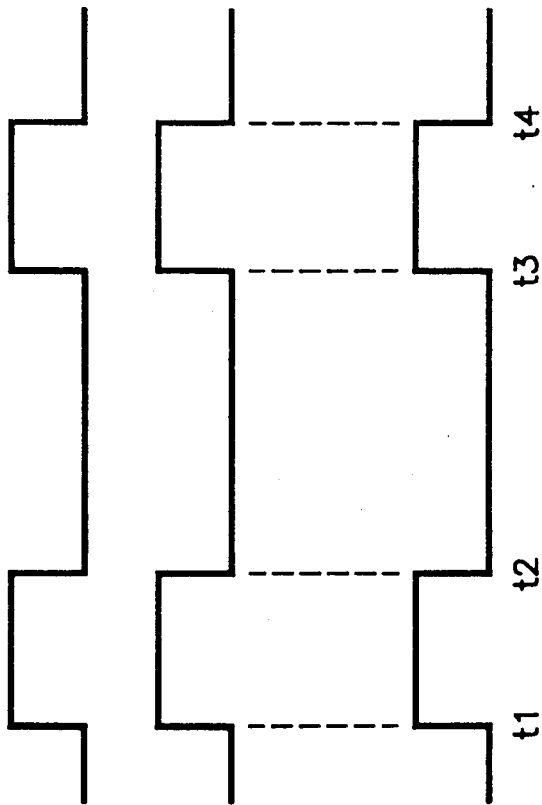
FIG. 3 shows waveforms of the ring signals for furnishing the conventional ring service to each of the subscriber groups.
Figure 4:
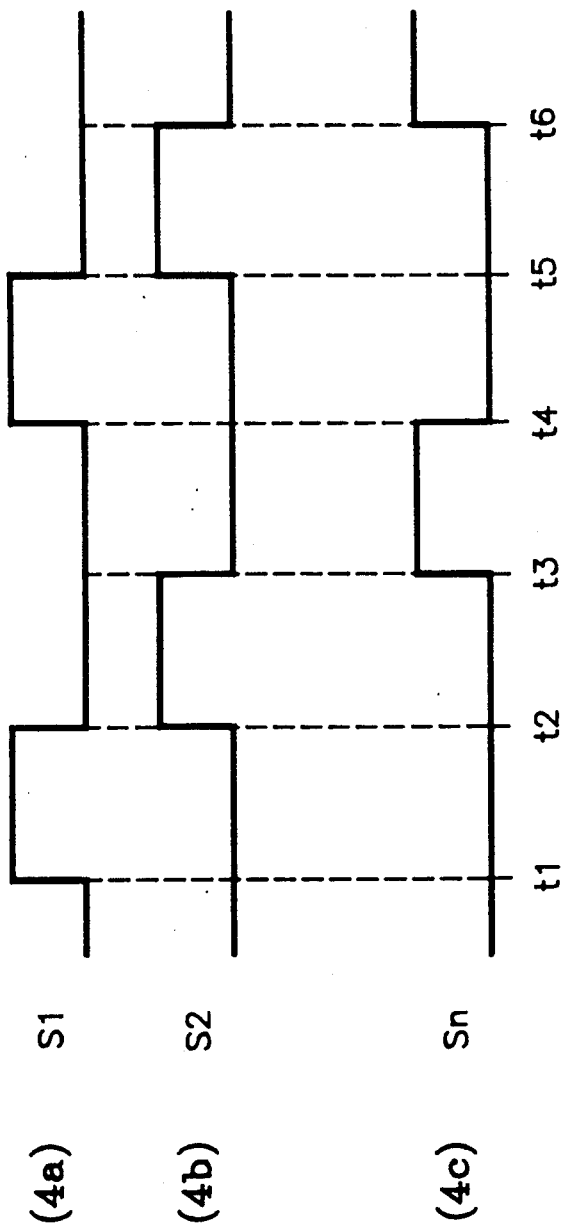
FIG. 4 shows waveforms of the ring signals for furnishing the ring service to each of the subscriber groups in accordance with the present invention.
Figure 5:
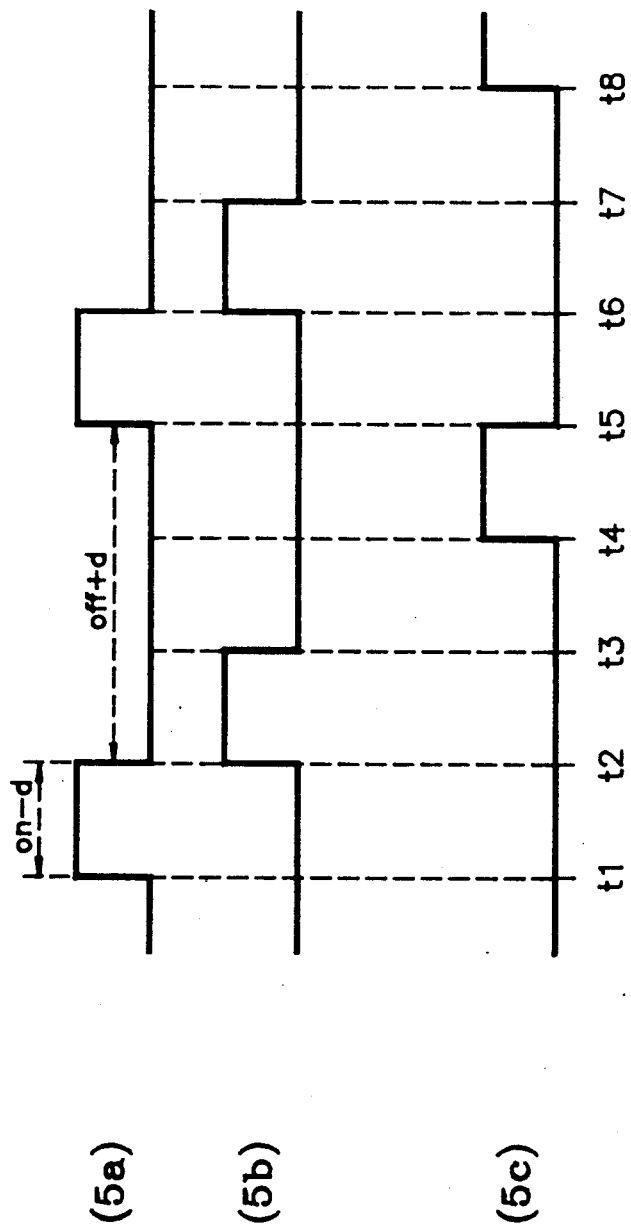
FIG. 5 shows waveforms of another ring signals for furnishing the ring service to each of the subscriber groups, wherein a subtracting time is applied upon exceeding the allowable service capacity of the exchange system, in accordance with the present invention.

Referring to FIG. 4 showing the inventive time for furnishing the ring signal to the subscriber's telephones ST1–STn, the waveforms 4a–4c represent the intermitting time periods for switching the ring relays Ry1–Ryn on or off to supply the ring signal to the telephones ST1–STn, employing the time period for intermitting the ring signal as shown in FIG. 2. ON represents the time interval during which the ring current flows, and OFF the time interval during which the ring current does not flow. Here, one stage on/off time intervals are represented for convenience.

4a represents the time period for intermitting the relay Ry1 of the subscriber circuit 20 for supplying the ring signal to the subscriber's telephone ST1, wherein t1–t2 represents the on-time, and t2–t4 the off-time.

Namely, it begins to ring at t1, stops ringing form t2 to t4, and again rings from t4 to t5. 4b represents the time period for intermitting the relay Ry2 of the subscriber circuit 20 for supplying the ring signal to the telephone ST2, wherein it begins to ring at t2, continuing to t3, and stops ringing from t3 to t5. If n telephones ST1-STn are devided into several groups for receiving the ring service, the telephones assigned to only the first group ring during the time interval t1-t2. Of course, during the time interval t2-t3 ring the telephones assigned to only the second group. Hence, the load put on the ring signal generator circuit 10 during the time interval t1-t2 depends only on the number of the subscribers assigned to the first group, and the load during the time interval t2-t3 only on the number of the subscribers assigned to the second group. Namely, the load put on the ring signal generator circuit 10 to furnish the ring service to n subscribers is only the portion obtained by dividing the n by the number of the groups. Consequently, the capacity of the ring signal generator circuit 10 depends on the maximum number of the subscribers assigned to one group.

FIG., 5 which is an improvement of FIG. 4, represents another on/off intermitting time period for dynamically changing the on-time in case that the capacity of the ring signal generator circuit 10 is small. In this case, the subtracting time is introduced for dynamically reducing the on-time interval, since the ring current becomes reduced if the number n of the subscribers is greater than the product of the number of the basic groups and the number of the subscribers assigned to a group.

Assuming that the number of the subscribers to be served be n, the number of the subscribers to which the ring signal generator 10 may properly furnish the ring service to subscribers be m, the on-time interval be On, the off-time interval off, and the subtracting time d, the new on-time interval is On-d, and the number of the groups allowable during the time On+Off is $$\frac{On + Off}{On - d}$$

Hence, the number of the subscribers to be served is $$n \leq \left( \frac{On + Off}{On - d} \right) m \quad (1)$$

The subtracting time obtained from the above formula is expressed by the following formula (2).

$$d \geq On - \frac{m(On + Off)}{n} \quad (2)$$

Namely, d will be the minimum integer that satifies the inequality (2). For example, assuming On=4, Off=8, and m=2, the value of d will be expressed as in the following table 1 according to the number n of the subscribers.

TABLE 1

| n | 1 | 2 | 3 | 4 | 5 | 6 | 7 | 8 | 9 | 10... |
|---|---|---|---|---|---|---|---|---|---|---|
| d | 0 | 0 | 0 | 0 | 0 | 0 | 1 | 1 | 2 | 2... |

Figure 6:
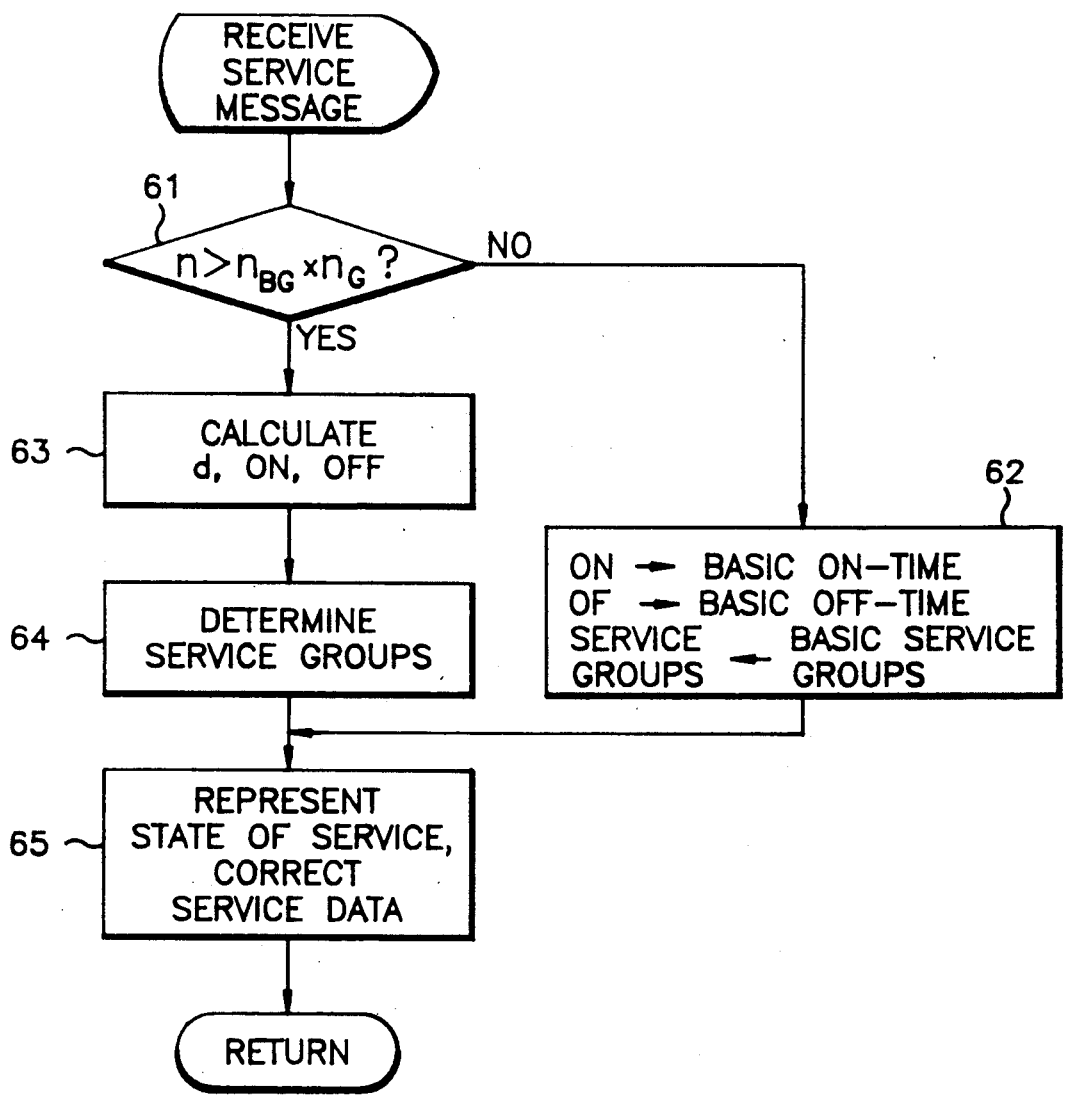
FIG. 6 shows a flow chart of registering subscribers of the ring service of the present invention.

Referring to FIG. 6, the registration of the subscribers to be served comprises the steps of:

comparing the total number of the subscribers to be served with the product of the number of the basic groups "$n_{BG}$" and the maximum number of the subscribers in one of said groups "$n_S$";

conforming the on/off time of the ring signal to the basic on/off time by clearing the subtracting time (d) and the number of the ring service groups to the number of the basic groups when the number of the subscribers to be served is smaller or equal than the product of the number of the basic groups and the maximum number of the subscribers in one of the basic groups;

calculating the subtracting time (d), the dynamic on/off time, and the number of the ring service groups when the number of the subscribers to be served is greater than the product of the number of the basic groups and the maximum number of the subscribers in one of the basic groups; and presenting the state of the ring service and the intermitting group onto the subscriber's port table together with correcting the present service data table.

Namely, FIG. 6 describes determination of the state of ring service whenever a new subscriber is registered, according to the new on/off time and subtracting time obtained by calculating the number of the present subscribers. In this way, the number of the groups to be served is determined to assign the new subscriber to one of the ring signal groups.

Figure 7:
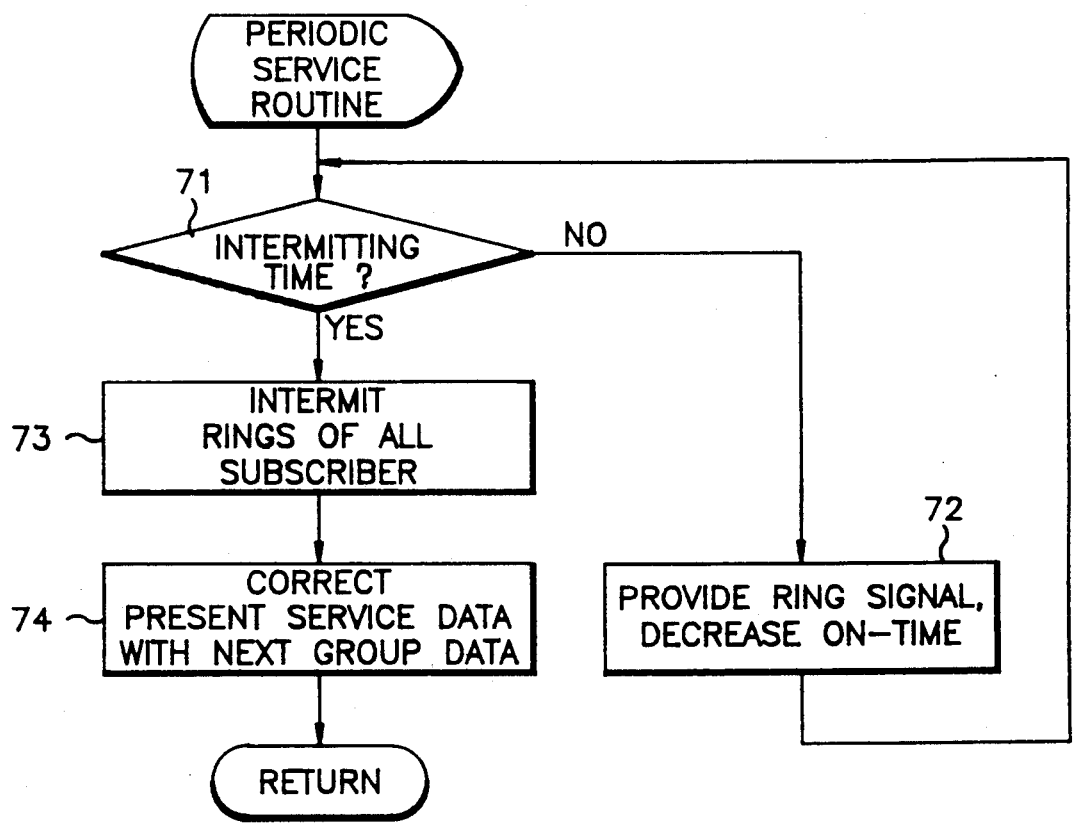
FIG. 7 shows a flow chart of periodically intermitting a ring current for a periodic ring service according to the present invention.

Referring to FIG. 7, furnishing ring signal service with subscribers comprises the steps of;

checking the intermitting time;

decreasing on-time of the present service data when it is not the intermitting time;

providing all the subscribers in a corresponding group with the ring signal when it is the intermitting time; and correcting the present service data by the data of the a next group, after the ring signal service.

Namely, according to a routine of FIG. 7 for intermitting the ring current to furnish the periodic ring service, on-time is newly set to change the intermission interval at the at the moment of intermitting ring signal service, i.e., at the moment of changing signal from on to off or vice versa when there exists a subscriber to be served in the subscriber port. In this way, the subscriber's telephone begins to ring or stops ringing.

Referring to FIG. 8A-FIG. 8B, FIG. 8A schematizes the subscriber's port table, FIG. 8B the service group table, FIG. 8c the dynamic data table, FIG. 8D the basic data table, and FIG. 8E the present service data table.

Now, a preferred embodiment of the present invention will be described with reference to FIG. 4-FIG. 8E.

The ring relays Ry1-Ryn of the subscriber's circuit 20 are connected to the ring signal generator 10 according to the conventional subscriber's circuit in order to supply the ring current to the telephones ST1-STn by the CPU module 30. The control signal from the CPU module 30 is decoded by the decoder 50 to control the addressable latch circuit 40 to latch the ring service data from the CPU module 30, thereby switching the ring relays Ry1-Ryn on or off.

When the ring signal should be sent to the telephones ST1-STn, a ring message is produced by comparing the total number of the telephones to be served with the number of the telephones to be basically served in the step 61. If the number of the subscribers is smaller or equal than the number of the telephones allowed to be served, the ring service is possibly served with the basic on/off time in the basic groups in the step 62 of FIG. 6. Hence, the CPU module 30 causes the subtracting time (d) to be zero on the table of the dynamic ring signal service data table, as shown in FIG. 8c. The on/off time is the basic on/off time as shown in the basic service data table of FIG. 8D. Also, the number of the ring service groups equals to the number of the basic groups.

In the step 61, if the number of the subscribers is greater than the number of the telephones allowed to be served, the subtracting time (d) is calculated to satisfy the equation (2), and recorded into the table of the dynamic ring signal service data table of FIG. 8C. In this case, the on-time will be the remainder left after subtracting the subtracting time (d) from the basic on-time of the basic service data table, and the off-time the addition of the basic off-time and the subtracting time. The addition of the on-time and off-time obtained by the step 63 is divided by the new on-time so as to determine the number of the ring service groups. Subsequently to the above steps 62, 63 and 64, the state of the ring service is presented on each of the subscriber's port table in the step 65, as shown in FIG. 8A, and one of the groups having less subscribers than other groups is chosen as the service groups of the subscribers from the service group table of FIG. 8B. Additionally, the service group table is corrected to new data.

In the service routine of FIG. 7, it is determined whether the on-time of the present service data table FIG. 8E is zero or not, in the step 71. If it is not zero, the on-time is reduced by some count time in the step 72, and supplying ring signal to corresponding subscribers is continued. However, if it is the intermitting time, that is, if the on-time of the present service data table FIG. 8E is zero, the rings of all the subscribers assigned to the present service group are intermitted in the step 73. Thereafter the present service group of the present service data table of FIG. 8E is corrected by the next served group data. The on-time thereof is corrected by the on-time of the dynamic ring signal service data table FIG. 8c in the step 74.

As described above, the present invention obviates the heavy load to be put on at any one time, so that the scale of the ring signal generator is minimized, and the maximum service is secured for the users with its own capacity. Particularly, the present invention provides a method to automatically adjust the on/off time according to the amount of the ring load to equally distribute it without adding any means to the designed system.

What is claimed is:

1. A method of performing automatically equalized distribution of ring load for ring service in an exchange system, comprising the steps of:
    comparing a total number of subscribers to be ring serviced with a number of basic groups multiplied by a maximum number of subscribers in one of said basic groups;
    conforming an on/off time of a ring signal to a basic on/off time, by clearing a subtracting time, and also conforming a number of ring service groups to the number of basic groups, when the total number of subscribers to be served is smaller than the number of basic groups multiplied by the maximum number of subscribers in one of the basic groups;
    calculating the subtracting time, a dynamic on/off time, and the number of ring service groups, when the number of subscribers to be served is greater than the number of basic groups multiplied by the maximum number of subscribers in one of the basic groups;
    presenting a state of the ring service and a group to be served onto a subscriber port table and correcting data in a present service data table;
    providing all the subscribers in a corresponding group with the ring signal when it is time for intermittent the ring service; and
    after the ring signal service, correcting the present service data table by data of a next group.

2. A method of automatically equalizing distribution of a ring load for ring service in an exchange system, comprising the steps of;
    comparing a total number of subscribers to be serviced by a ring signal with a value obtained by multiplying a number of basic groups by a maximum number of subscribers able to be provided with the ring signal in one of said groups;
    adjusting an on/off time of the ring signal to a basic on/off time, by clearing a subtracting time, and also adjusting a number of ring service groups to the number of basic groups, when the total number of subscribers to be serviced is smaller than the number of basic groups multiplied by said maximum number of subscriber;
    generating current service data by calculating the subtracting time, a dynamic on/off time, and a number of ring service groups, when the number of subscribers to be ring serviced is greater than the number of basic groups multiplied by said maximum number of subscribers;
    presenting a state of the ring service to a subscriber port table and current service data for a first group to be served to said subscriber port table and to a present service data table; and
    providing all the subscribers in said first group with the ring signal service during an ON phase of the dynamic ON/OFF time.

3. The method of claim 2, further comprised of, after providing the ring signal service to said first group, generating new current service data, and presenting said new current service data to said present service data table, for another group to be served with said ring signal service.

4. A method of equally and adequately furnishing a ring service to plural subscribers in a telephone exchange system by providing an adequate ring signal to said plural subscribers from a single ring generator comprising the steps of:
    comparing a desired number of subscribers to be serviced by said ring service with a predetermined number;
    adjusting an on/off time for the ring signal to a basic on/off time when said desired number of subscribers to be serviced is equal to or less than said predetermined number, and recording said basic on/off time in a basic service data table;
    calculating a subtracting time and recording said subtracting time into a dynamic service data table, determining a dynamic on/off time for the ring signal in response to said subtracting time and calculating a number of ring service groups to be serviced when said desired number of subscribers to be serviced is greater than said predetermined number, wherein said dynamic on/off time and said number of ring service groups to be serviced are also recorded in said dynamic service data table;

determining whether or not on-time data in a present service data table is indicative of an intermittent ring signal service;

providing said ring signal, according to said dynamic on/off time, to each subscriber in a present ring service group listed in said present service data table when said on-time data is indicative of said intermittent ring signal service; and updating said present service data table to list a next ring service group to be serviced.

5. The method of equally and adequately furnishing a ring service to plural subscribers in a telephone exchange system by providing an adequate ring signal to said plural subscribers from a single ring generator as claimed in claim 4, further comprising the steps of:

presenting data indicative to a state of the ring service to a subscriber port data table and data indicative of to which ring service group a subscriber is assigned, to a subscriber port data table; and correcting a service group table to reflect the number of subscribers in each ring service group.

6. The method of equally an adequately furnishing a ring service to plural subscribers in a telephone exchange system by providing an adequate ring signal to said plural subscribers from a single ring generator as claimed in claim 4, further comprising the steps of:

providing said ring signal to said present ring service group for an on-time according to said on-time data in said present service data table when said on-time data is not indicative of said intermittent ring signal service;

reducing said ring signal on-time by a predetermined count to provide a reduced ring signal on-time; and providing said ring signal to said present ring service group according to said reduced ring signal on-time.

7. The method of equally and adequately furnishing a ring service to plural subscribers in a telephone exchange system by providing an adequate ring signal to said plural subscribers from a single ring generator as claimed in claim 6, wherein said predetermined number in said step of comparing is equal to a number of basic ring service groups multiplied by a maximum number of subscribers in one of said basic ring service groups.

8. The method of equally and adequately furnishing a ring service to plural subscribers in a telephone exchange system by providing an adequate ring signal to said plural subscribers from a single ring generator as claimed in claim 7, wherein said on-time data in said present service data table is indicative of an intermittent ring signal service when said on-time data is zero.

* * * * *

UNITED STATES PATENT AND TRADEMARK OFFICE
CERTIFICATE OF CORRECTION

PATENT NO. : 5,056,135  
DATED : 8 October 1991  
INVENTOR(S) : Kyo-Hwan AHN Page 1 of 3

It is certified that error appears in the above-identified patent and that said Letters Patent is hereby corrected as shown below:

Column 1,   Line 37,   delete "increases";

Line 38,   insert --increases-- after "served";

Line 51,   change "requires" to --require--;

Column 2,   Line 6,    change "groups" to --group--;

Line 10,   delete "the" (second occurrence);

Line 26,   insert --an-- after "of"; (second occurrence)

Line 27,   change "for" to --to--;

Line 36,   change "signals" to --signal--;

Column 3,   Line 1,    change "form" to --from--;

Line 7,    change "devided" to --divided--;

Column 4,   Line 9,    change "or equal than" to --than or equal to--;

Line 37,   delete "a";

Line 41,   delete "at the" (second occurrence);

Line 65,   delete "the" (second occurrence).

UNITED STATES PATENT AND TRADEMARK OFFICE
CERTIFICATE OF CORRECTION

PATENT NO. : 5,056,135

DATED : 8 October 1991

INVENTOR(S) : Kyo-Hwan AHN

It is certified that error appears in the above-identified patent and that said Letters Patent is hereby corrected as shown below:

Column 4,      Line 66,    insert --than-- after "smaller";

Line 67,    change "than" to --to--;

Column 5,      Line 1,     delete "the" (second occurrence);

Line 8,     delete "the" (first occurrence);

Line 19,    change "Subsequently" to --Subsequent--;

Line 22,    delete "the" (first occurrence);

Line 29,    delete "the" (first occurrence);

Line 30,    delete "the";

Line 35,    delete "the";

UNITED STATES PATENT AND TRADEMARK OFFICE
CERTIFICATE OF CORRECTION

PATENT NO. : 5,056,135

DATED : 8 October 1991

INVENTOR(S) : Kyo-Hwan AHN

It is certified that error appears in the above-identified patent and that said Letters Patent is hereby corrected as shown below:

Line 40, delete "the".

Signed and Sealed this

Twenty-seventh Day of April, 1993

Attest:

MICHAEL K. KIRK

Attesting Officer

Acting Commissioner of Patents and Trademarks